(12) United States Patent
Kane et al.

(10) Patent No.: US 9,074,882 B1
(45) Date of Patent: Jul. 7, 2015

(54) IMAGE NULL-BALANCE SYSTEM WITH MULTISECTOR-CELL DIRECTION SENSING

(75) Inventors: David M. Kane, Tucson, AZ (US); Philip Sklwyn, Falls Church, VA (US)

(73) Assignee: Arete Associates, Northridge, CA (US)

( * ) Notice: Subject to any disclaimer, the term of this patent is extended or adjusted under 35 U.S.C. 154(b) by 0 days.

(21) Appl. No.: 13/507,303

(22) Filed: Jun. 19, 2012

Related U.S. Application Data

(62) Division of application No. 12/661,634, filed on Mar. 18, 2010, now Pat. No. 8,203,703.

(51) Int. Cl.
*G01C 1/00* (2006.01)
(52) U.S. Cl.
CPC ........................................ *G01C 1/00* (2013.01)
(58) Field of Classification Search
USPC ....................................................... 356/141.5
See application file for complete search history.

(56) References Cited

U.S. PATENT DOCUMENTS 6,493,490 B1 * 12/2002 Steiger ............................ 385/52

* cited by examiner

*Primary Examiner* — Isam Alsomiri
*Assistant Examiner* — Vincente Rodriguez
(74) *Attorney, Agent, or Firm* — Furman IP Law

(57) ABSTRACT

A light beam is detected/localized by multisector detector—quad-cell, or 5+ sectors handling plural beams. Preferences: Beams focus to diffraction limit on the detector, which reveals origin direction by null-balance—shifting spots to a central sector junction, and measuring shifts to reach there. One or more MEMS reflectors, and control system with programmed processor(s), sequence the spot toward center: following a normal to an intersector boundary; then along the boundary. One afocal optic amplifies MEMS deflections; another sends beams to imaging optics. After it's known which sector received a spot, and the beam shifts, source direction is reported. The system can respond toward that (or a related) direction. It can illuminate objects, generating beams reflectively. Optics define an FOR in which to search; other optics define an FOV (narrower), for imaging spots onto the detector. The FOR:FOV angular ratio is on order of ten—roughly 180:20°, or 120:10°.

19 Claims, 12 Drawing Sheets

IMAGE NULL-BALANCE SYSTEM WITH MULTISECTOR-CELL DIRECTION SENSING

RELATED DOCUMENTS

This document is based upon, and is a Divisional of, and correspondingly claims priority of, U.S. Nonprovisional patent application Ser. No. 12/661,634, filed Mar. 18, 2010; which is a continuation of U.S. Nonprovisional patent application Ser. No. 11/409,529, filed Apr. 21, 2006; which is a continuation of PCT Application PCT/US06/01056, filed Jan. 12, 2006; which claims the priority of its precursor Provisional Patent Application 60/643,867 filed Jan. 13, 2005. Other related documents include, inter alia:

- Kane, provisional application Ser. 60/433,301 and corresponding PCT application PCT/US03/39535 "OPTICAL SYSTEM";
- Kane, provisional application Ser. 60/381,286 "MEMS BEAM STEERING AND SHARED APERTURE OPTICAL SYSTEM", also incorporated by reference in the provisional application and its corresponding PCT application that are mentioned immediately above;
- Kane et al., application Ser. No. 10/142,654 "HIGH-SPEED, LOW-POWER OPTICAL MODULATION APPARATUS AND METHOD", and three provisional applications incorporated by reference therein, namely 60/289,883, 60/327,759 and 60/327,760.

All are wholly incorporated by reference into this document.

FIELD OF THE INVENTION

The invention relates generally to notifying people or automatic equipment of an incident light beam, and its direction and characteristics—and possibly developing a response—and more specifically to use of quad cells (four-sector sensing cells) or other multiple-sector sensing cells, for determining the direction. The invention may passively detect a light beam that is generated externally, or may originate an outgoing flash and detect a reflected beam.

BACKGROUND

The availability of optical systems that dazzle or blind an equipment operator, guide a beam-following vehicle to an equipment platform, or laser-pinpoint an object of interest, represent a threat to manned and unmanned apparatus. Ultimately, a technology is required that can perform these functions:

1. separate lasers from false-alarm light sources (natural or manmade)
2. determine the wavelength of the laser
3. determine the location of the laser threat
4. determine the pertinent laser event temporal and power characteristics for both CW and pulsed lasers
5. cover a wide dynamic range of laser powers, sensitive to energy levels many orders of magnitude lower than those which are dangerous to vision.

Conventional Detection Systems

Current laser-warning receivers are principally based on detecting where light falls on a focal plane located behind a large field-of-view (FOV) optic. These systems are relatively slow in their response, and relatively inaccurate in terms of their line-of-sight (LOS) measurement of the location of the incoming laser beam.

In addition, they are relatively bulky and heavy. Further, existing laser-detection and -warning receivers provide little if any spectral information.

Examples are the present laser-detection systems built by companies such as BAE systems and Goodrich, particularly the AN/AVR-2 Laser Detection Set 112 (FIG. 1). They are bulky (not compatible with installation in an aircraft cockpit), highly inaccurate in terms of determining location of a laser-beam source, and yield no spectral information for the incoming beam.

Companies such as Princeton Scientific Instruments have developed smaller laser-detection packages 113 that are compatible with implementation in a small aircraft. Again, however, these provide no directional or spectral information, and can only detect average irradiance levels as low as $10^{-11}$ $W/cm^2$.

Components not Previously Associated with Laser Warning (Except in Our Own Work)

One such device is a four-sector detector or quadrant detector, familiarly called a "quad cell". Prior to mention in some of the Kane documents listed above, quad cells to the best or our knowledge were not used in laser-warning systems but rather were known primarily for light-beam position control in industrial machinery.

In one of those earlier documents, the quad cell was said to be inferior to a so-called "position-sensing detector" (PSD). A quad cell is a detector with four discrete photosensitive sectors arranged within a circular overall detection array, with corners of each of the four sectors mutually adjoining at the center of the circle.

Independent detection-signal leads from the four discrete sensing areas are brought out separately to independent circuitry, enabling detection and particularly quantitative comparison of light levels incident on the four sectors. Conventionally such comparison is used simply to find ratios of the radiant powers reaching the different sectors.

Such ratios are assumed to be due to distribution of light from a single common source, on the overall detector surface. Based on that assumption, such ratios are conventionally used to directly calculate direction of origin of the light.

To facilitate that kind of operation, conventional systems defocus the incident light spot so that it spans, speaking very roughly, about one-third or more of the overall sensor diameter. The rationale is to provide that at least some of the light will strike each one of the four sectors—thus enabling routine ratioing operation based upon the assumption that none of the sectors receives zero light.

Quad cell response is very fast, but the pointing accuracy of such a conventional system is quite poor—particularly in a low-light-level environment. This is because signal-to-noise properties of such operation are distinctly unfavorable in comparison with those of, e.g., a PSD also as conventionally used.

Quad cells heretofore have been used in passive sensing systems exclusively. Thus we are not aware of any prior usage of a quad cell in a system which emits a probe flash and then analyzes reflected return.

Another component previously unknown in laser-warning systems, except our own earlier development efforts, is an array of one or more very small mirrors, particularly micro-electromechanical systems ("MEMS") mirrors. The first significant commercial use of such mirrors was the Texas Instrument Digital Light Projector (DLP) MEMS array.

Formed in an array of 1,000-by-1,000 two-axis 10 μm mirrors, the bi-stable mirrors were controlled open-loop, with the mirrors stepped from ±10° locations at rates on the order of 10 ms. The mirrors were not analog—more specifically, each one could only take on one of two positions about either axis—and were not particularly useful from a wavefront-correction perspective.

A more closely related development in MEMS scan-mirror arrays was in the area of optical switching, where the mirrors could be controlled open-loop about one or two axes over the entire range of mirror travel, and thus were "analog" in the sense of being able to point the mirrors. Lucent in its "Waverunner" optical switch, and Calient Networks, with its "3-D" MEMS-mirror optical switch, are good examples of this technology.

These arrays are typically larger, from millimeters to hundreds of millimeters, but have millisecond-level step-response characteristics because they are controlled open-loop. Areal densities of these arrays are also low, less than fifty percent; therefore significant modifications to their architecture are required to obtain an adequate array for an AMBS-quad system.

Conclusion

Accordingly the prior art has continued to impede achievement of uniformly excellent laser-alert equipment, and in particular has failed to make use of quad-cell and MEMS technologies to enhance laser-alert capabilities. Thus important aspects of the technology used in the field of the invention remain amenable to useful refinement.

SUMMARY OF THE DISCLOSURE

The present invention introduces just such refinement. In preferred embodiments the invention has several independent aspects or facets, which are advantageously used in conjunction together, although they are capable of practice independently.

In preferred embodiments of its first major independent facet or aspect, the invention is apparatus for detecting, and determining the direction of, an incident beam of light. The apparatus includes a multiple-sector-cell detector. It also includes optics for forming a sharply focused image of the beam on the multiple-sector-cell detector.

(In the bodies of certain of the appended claims the word "such" is used, in place of "the" or "said", when referring back to terms introduced in preamble that are not part of the claimed inventive combination but rather are parts of the environment or context of the invention. The purpose of this convention is to make particularly clear which recited elements are within the claimed invention and which are not, thereby more particularly pointing out and more distinctly claiming the invention. For example the phrase "such beam" emphasizes that the light beam is not part of the invention but only something in the environment to which the elements of the invention are referred or referenced.)

In addition this first main aspect or facet of the invention includes some means, responsive to the multiple-sector-cell detector, for determining the direction of origin of the beam. For purposes of breadth and generality in discussing the invention, these means may be called simply the "determining means".

The foregoing may represent a description or definition of the first aspect or facet of the invention in its broadest or most general form. Even as couched in these broad terms, however, it can be seen that this facet of the invention importantly advances the art.

In particular, as will be recalled the conventional use of multiple-sector-cell detectors (of which essentially the only known type is a quad cell) has called for a broadly defocused beam image ("spot"), specifically to facilitate a quick and easy determination of beam-source location. That determination normally is through proportional response to energy found in the different quadrants respectively, and the relatively large spot size makes the likelihood very high that some radiant energy will be initially found in at least two quadrants.

The relatively large spot size, however, carries with it high optoelectronic noise, which in turn degrades the potential pointing accuracy of the apparatus. Thus in the present invention the sharply focused beam image is far less noisy and so can yield a correspondingly far more accurate beam origin.

In practice of our invention the mechanism for locating that source location, as will be seen, advantageously is something other than the proportional response employed conventionally. This mechanism does not rely upon initially finding irradiance in two or more quadrants.

Although the first major aspect of the invention thus significantly advances the art, nevertheless to optimize enjoyment of its benefits preferably the invention is practiced in conjunction with certain additional features or characteristics. In particular, one relatively preferable condition—for some situations—is that the multiple-sector-cell detector be a quad-cell detector.

Another is that the optics include means for focusing the beam to a substantially diffraction-limited spot on the detector. Here the term "substantially" (i.e., "in substance") is included to make clear that a mere minor or insubstantial departure from a "diffraction limited" focus provides no escape from the scope of the invention. In other words, it is not possible to design around the protection provided by this document merely by using an inconsequential variation from the diffraction limit.

Another basic preference is that the determining means interact with the detector in a null-balance mode of operation. If this preference is observed, then a subpreference is that the determining means deflect the sharply focused image to a central position, substantially common to the multiple sectors, and also measure the amount of deflection required to move the image to the central position.

If this subpreference, too, is observed, then a still-further-nested subsubpreference is that the deflecting-and-measuring means include an array of one or more MEMS mirrors. Another such subsubpreference is that the deflecting-and-measuring means include at least one programmed processor for sequencing the sharply focused image in a logical progression to the central position.

In this latter case it is yet further preferred that the programmed processor include programming for sequencing the sharply focused image to, first, a boundary between two of the sectors; and then along that boundary to the central position. If this is so, then it is still further preferred that the programmed processor include programming for deflecting the beam to the boundary by a first measured amount, along a track that is generally normal to the boundary; and then deflecting the beam by a second measured amount, along the boundary, to reach the central position. Even further yet, if these latter program features are included, then preferably the processor further includes programming for interpreting the two measured amounts of deflection to determine the position of the source of the beam.

The inclusion of an array of MEMS mirrors actually is also a basic preference. When this preference is observed, the apparatus also further includes a control system for operating the MEMS mirrors to deflect the sharply focused image along the detector.

When MEMS mirrors are included the apparatus also preferably includes an afocal optical element for amplifying the deflecting produced by the MEMS mirrors. This particular feature, the afocal optic, is also applicable to many of the other combinations and subcombinations of features and preferences discussed above. The focal elements also directs the beam to the previously mentioned image-forming optics.

As an alternative preference to the use a quad cell as mentioned above, it is preferable that instead the multiple-sector-cell detector include at least five sectors. These five sectors, if present, facilitate detecting—and determining the direction of—plural incident beams of light.

In preferred embodiments of its second major independent facet or aspect, the invention is a method for detecting, and determining the direction of, an incident beam of light. The method includes the steps of receiving the beam on a multiple-sector-cell detector.

It also includes the step of operating the detector to determine which of the multiple sectors has received the beam. In addition it includes the step of deflecting the beam by a measured amount, along the detector, to reach a boundary between only two of the sectors.

The foregoing may represent a description or definition of the second aspect or facet of the invention in its broadest or most general form. Even as couched in these broad terms, however, it can be seen that this facet of the invention importantly advances the art.

In particular, as can now be appreciated this second main facet of the invention is complementary to the first, in that this second facet provides the previously mentioned mechanism for locating the beam origin. This mechanism avoids reliance upon the energy proportioning which is basic to origin location in conventional systems—and which, as explained earlier, is very inaccurate.

Also this mechanism does not rely upon finding any initial measurement state with radiant energy received in two or more sectors. Furthermore the deflecting step departs very markedly from prior-art procedures.

Although the second major aspect of the invention thus significantly advances the art, nevertheless to optimize enjoyment of its benefits preferably the invention is practiced in conjunction with certain additional features or characteristics. In particular, preferably the deflecting step includes deflecting the beam (i.e. its focused spot) along a track or path that is generally normal to the boundary.

If this preference is observed, then a further set of preferences, most of them generally nested in this order, includes the steps of:

deflecting the beam by another measured amount, along the boundary, to reach a substantially central position substantially common to the multiple sectors;

interpreting the two measured amounts of deflection to determine the position of the source of the beam;

reporting, to a human operator or to an automatic apparatus, the direction of the source of the beam;

further detecting, and determining the source direction of, and reporting, a second beam;

reporting, to a human operator or to an automatic apparatus, the direction of the source of the beam;

further detecting, determining the source direction of, and reporting, a second beam.

Another preference that is basic, relative to this second main aspect of the invention, includes the step of reacting to the beam detection by making a response toward the direction of the source, or to a known related direction. Yet another preference includes the step of projecting light outward to illuminate an object and generate the incident beam by reflection from the object.

In preferred embodiments of a third major independent facet or aspect, the invention is apparatus for detecting, and determining the direction of, plural incident beams of light. The apparatus includes a multiple-sector-cell detector.

It also includes first optics for defining a field of regard within which to search for the beams. Furthermore the apparatus includes second optics defining, at the multiple-sector-cell detector, a field of view that is within and smaller than the field of regard.

These second optics also form a sharply focused image of the beam, if it is within the field of view, on the multiple-sector-cell detector. Preferred embodiments of this third main aspect of the invention also include some means, responsive to the multiple-sector-cell detector, for determining the direction of origin of the beam.

If desired these last-mentioned means maybe simply called the "determining means". The foregoing may represent a description or definition of the third aspect or facet of the invention in its broadest or most general form. Even as couched in these broad terms, however, it can be seen that this facet of the invention importantly advances the art.

In particular, the nested field of view within the larger field of regard facilitates discrimination of plural and even multiple incident light beams from one another.

This two-field characteristic also makes it easier for the invention to continue monitoring of one beam while also continuing to watch for others. Moreover it enables an artificially generated light beam, to be detected, to be more readily distinguished from natural sources.

Although the third major aspect of the invention thus significantly advances the art, nevertheless to optimize enjoyment of its benefits preferably the invention is practiced in conjunction with certain additional features or characteristics. In particular, preferably the field of regard and the field of view respectively subtend angles whose ratio is on the order of ten.

Also preferably the field of regard and the field of view respectively subtend angles of roughly 180 and 20 degrees respectively. An alternative preference is that they subtend angles of roughly 120 and 10 degrees respectively.

The foregoing features and benefits of the invention will be more fully appreciated from the following detailed description of preferred embodiments—with reference to the appended drawings, of which:

DETAILED DESCRIPTION OF PREFERRED EMBODIMENTS

Figure 1:
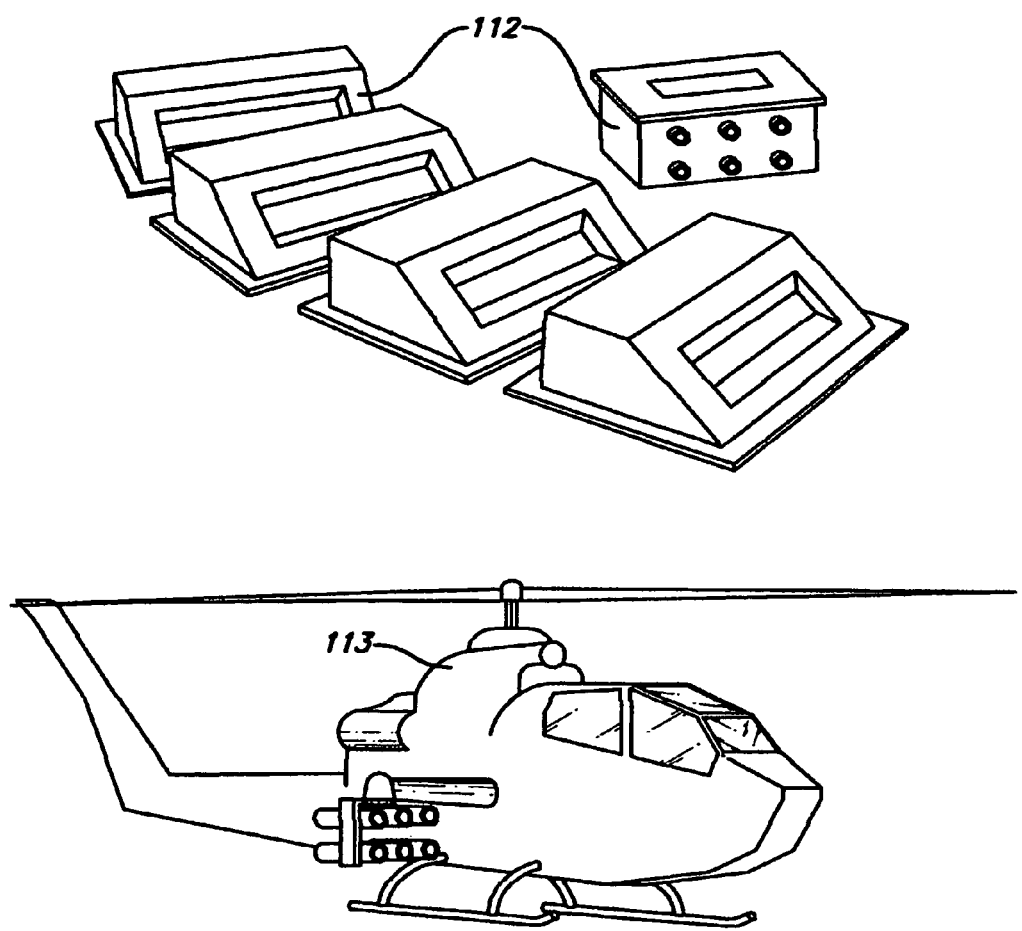
FIG. 1 is, in the upper view, Goodrich AN/AVR-2 laser detection set, and in the lower view a helicopter equipped with a Princeton Scientific package in an external mount.

Preferred embodiments of the invention include an afocal MEMS beam-steering system with a multiple-sector sensing cell. The multisector cell may have four sectors—i.e., may be a four-sector cell or so-called "quad cell", as described in the "BACKGROUND" section of this document—or may have a different number of sectors. A higher number, in particular, facilitates independent discrimination and analysis of two or more incident beams; however, a sensor having three sectors is also workable and within the scope of the invention.

The multisector cell (e.g. quad sensor) at least initially sees the entire field-of-view ("FOV") and receives the incoming laser beam, preferably focused sharply. Ideally it is focused to a substantially diffraction-limited spot.

Use of a sharp focus departs very dramatically and surprisingly from the conventional practice, introduced in the "BACKGROUND" section, of defocusing the beam to facilitate operation of a quad cell. The larger spot size, as mentioned earlier, enables the system to find some optical energy in each sector (quadrant), and thereby to drive the beam position rather straightforwardly to an optical null-balance.

The larger spot, however, also produces more electrooptical noise, and thus degrades the signal-to-noise ratio—and with it the pointing accuracy of the cell. We have realized that far higher signal-to-noise and therefore far finer pointing accuracy is attainable by use of a sharply focused spot, and by employing other means to reach the null-balance condition.

More specifically, the present invention finds the null-balance point through a capture process that follows a logical sequence, exploiting the availability of a programmed microprocessor for driving a MEMS array of one or more mirrors to deflect the beam. The result is superb pointing accuracy, orders of magnitude finer than with a position-sensing detector (PSD) such as favored in the previous Kane '535 PCT application mentioned above.

Preferably the multisector cell receives the beam after passage through an afocal optical element, reflection by the MEMS scan-mirror array, and traversal of a focusing optic that provides the sharp focus mentioned above. The afocal lens effectively magnifies (in the space outside the optical system) the beam motion introduced by the MEMS array.

We have developed a MEMS array for use in this invention, to overcome many of the shortcomings described in the "BACKGROUND" section. Features of this new array will be introduced shortly.

Responding to beam-location signals from the multisector cell, a closed-loop control system steers the mirror array, driving the focused laser to the central intersection of the multisector cell in a time period on the order of 100 µs. Knowledge of the incoming laser-beam position is then automatically calculated from the known angles of the MEMS array, and the known magnification by the afocal lens.

With the incident beam location thus determined, all of part of the incident beam is then diverted to a focal-plane array ("FPA") for further analyses, preferably including spectral analysis. If desired, ongoing positional monitoring of a fraction of the beam can be performed during the FPA investigation. This dual functionality can be implemented by insertion of a beam splitter, or by other techniques for tapping out a beam fraction.

This approach offers significant advantages over alternative detection approaches:

excellent minimum incoming laser irradiance sensitivity, $10^{-13}$ $W/cm^2$ at 30° FOV, $10^{-12}$ $W/cm^2$ at 120° FOV;

improved response time, much faster than 100 µs step response as limited by the MEMS array, and 10 ns for the multisector cell alone;

focal-plane array (FPA) response time in tens of milliseconds;

ability to drive the incoming beam to a desired location within the local system, and provide multifunctional capability;

a secondary sensor can be positioned to accept radiation from the incoming laser and perform a spectral analysis on the beam;

finer uncertainty in the desired angle between the laser and the line-of-sight (LOS)—limited by signal-to-noise ratio (SNR of 10 results in LOS uncertainty of 100 µrad); in current systems by comparison LOS uncertainty is limited by number of pixels, and an array of 5,000.pixels by 5,000 pixels is required to achieve 100 µrad uncertainty over 30° FOV;

spectral-broadband measurements in the range of 0.5 to 5 µm are possible in a two-detector shared system; and our system is not limited to passive sensing, as was customary with prior quad cells, but rather is entirely compatible with active systems that emit a probe light flash and then analyze the reflected return.

Our system is also not limited to a four-sector or "quadrant" cell but rather encompasses use of an "Ndrant" or generalized multisector cell which facilitates detection and tracking of plural incident light beams concurrently.

The invention contemplates system-level architecture and performance for an AMBS-multisector-cell detection system, leveraging preexisting MEMS arrays.

AMBS-Multisector-Cell-Sensor Overview

Figure 2:
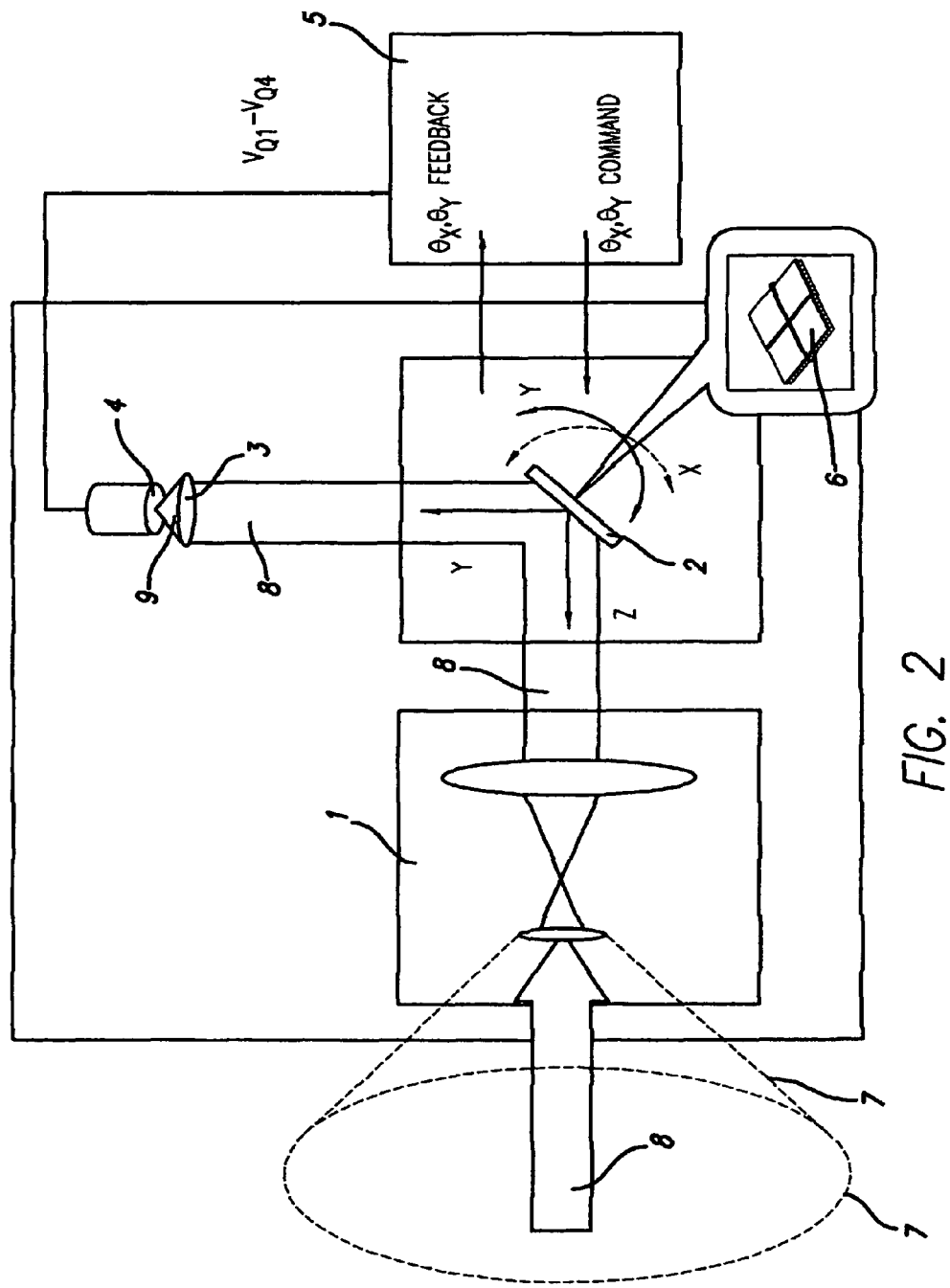
FIG. 2 is a functional block diagram of a preferred embodiment of a four-mirror prototype afocal MEMS beam-steering system with a quad-cell sensor, according to the present invention.

Preferred embodiments of this system include five primary elements: an afocal lens 1 (FIG. 2) magnifies the circular field of regard 7 (i.e., angular region of interest outside the optical system) that can be addressed by the two-axis MEMS scan-mirror array 2. The field of regard typically subtends between thirty and one hundred twenty degrees, or greater.

Tip motion Y is rotation about the Z axis. Tilt motion X is rotation in and out of the plane of the page. So-called "piston" motion is direct elevation or retraction normal to the plane of the array 2.

A reimaging lens 3 brings the incoming laser radiation 8 to a sharp focus. The focal spot, on the silicon or other multisector-cell sensor 4, is preferably diffraction limited.

The multisector-cell sensor can be a quad cell, i.e. can have four sectors; alternatively it can have only three sectors, or can have five or more. Use of an even number of sensors is favored to somewhat simplify the microprocessor sequential logic employed in driving the spot to the central position, since signals from diametrically opposite sectors are most straightforwardly balanced.

The sensor is used first to detect incoming laser irradiance, commonly in an essentially static so-called "staring" mode, and usually with the apparatus pointed straight out along the central axis of the afocal lens, to survey the entire initial field of view (FOV). Alternatively the initial operation may be in a repetitive-scanning mode—or after a moving source is first detected may generally follow the source. Then, after detection of incoming irradiance, the sensor is used to determine incoming laser line-of-sight location in a null-balance mode.

The latter is accomplished by driving the MEMS mirrors to force the focused laser spot to the center position on the quadrant detector, while monitoring the corresponding MEMS-mirror positions. The driving of the spot to the center is accomplished in two stages as outlined earlier, and as will be further detailed shortly.

Overall system closed-loop control is accomplished with a combined digital-analog controller 5 that operates in a proportional-integral-derivative (PID) mode. The scan angles $\theta_X$ and $\theta_Y$, read from the controls of the MEMS scan-mirror array 2 (similar to the greatly enlarged prototype four-mirror subarray), then yield the incoming laser beam LOS relative to the AMBS assembly.

Figure 3A:
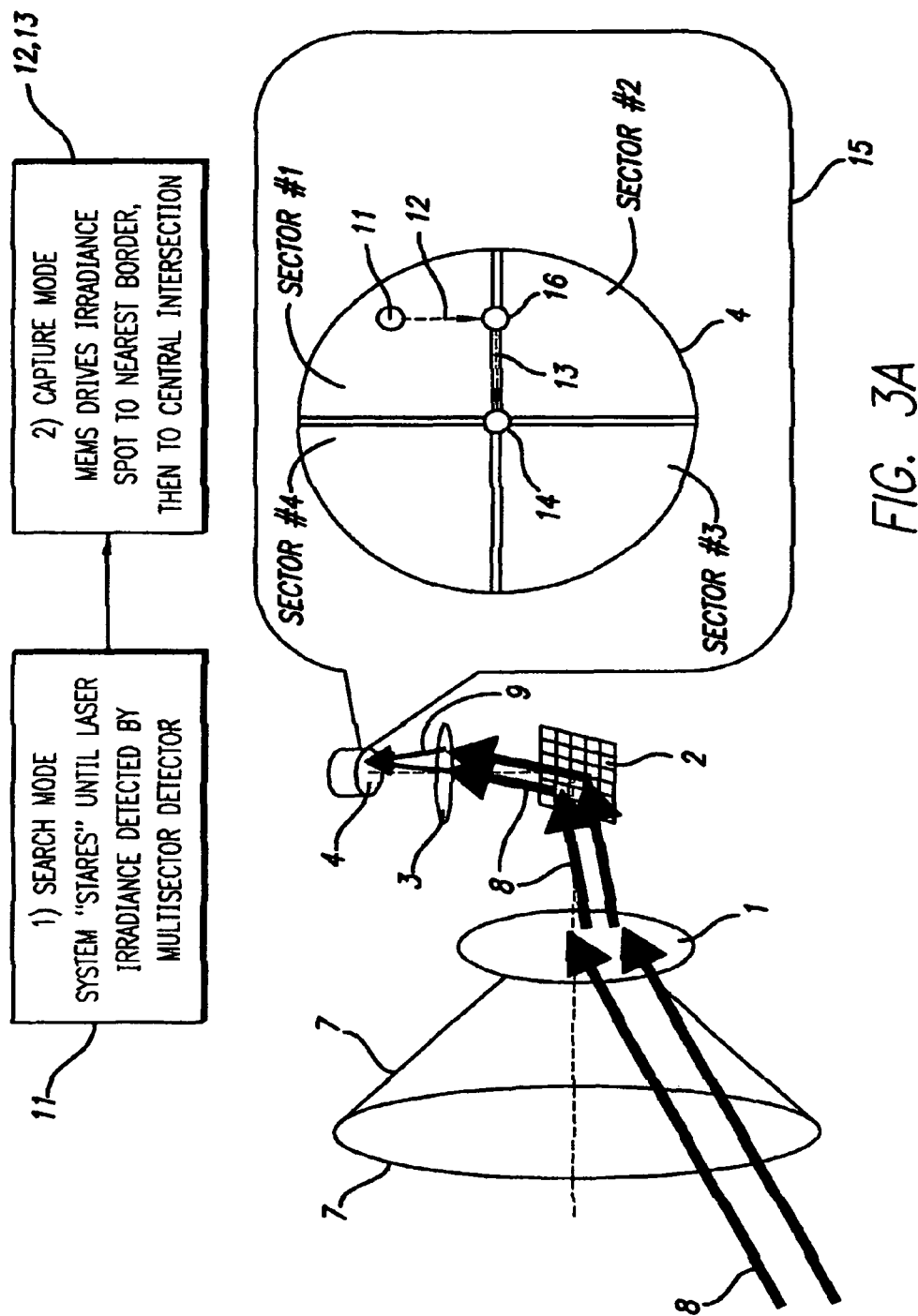
FIG. 3A is a like diagram, highly conceptual, for a full-array apparatus according to the invention—and also showing a beam search and capture sequence.

In accordance with preferred embodiments of this invention, the quad cell (or other multisector cell) can observe the entire FOV (FIG. 3A). The first step in the so-called "capture sequence" 15 is the search mode 11, 12 in which the irradiance is initially detected in, e.g., sector #1 of the detector face 4 (shown enlarged, 15).

The HEMS mirror array next drives 12 in a vertical (as illustrated) direction, i.e. parallel to the boundary between sectors #1 and #4, to sector #2—until the laser is detected by that sector. The apparatus sensitively positions the focused beam to equalize, as nearly as possible, the signal from the two sensor sectors #1 and #2. Since the spot has been made extremely small (to its diffraction limit), any error in this balance can be made insignificant.

Then, with the irradiance spot spanning 16 the boundary between sectors #1 and #2, the MEMS array drives 13 the spot along that boundary to the intersection of all the sectors (thus in a quad cell to the central intersection of the four quadrants) and maintains a continuing lock on that position 14. The MEMS-mirror angles, known to <1 mrad relative to the sensor line-of sight, provide the incoming laser beam angle.

Figure 3B:
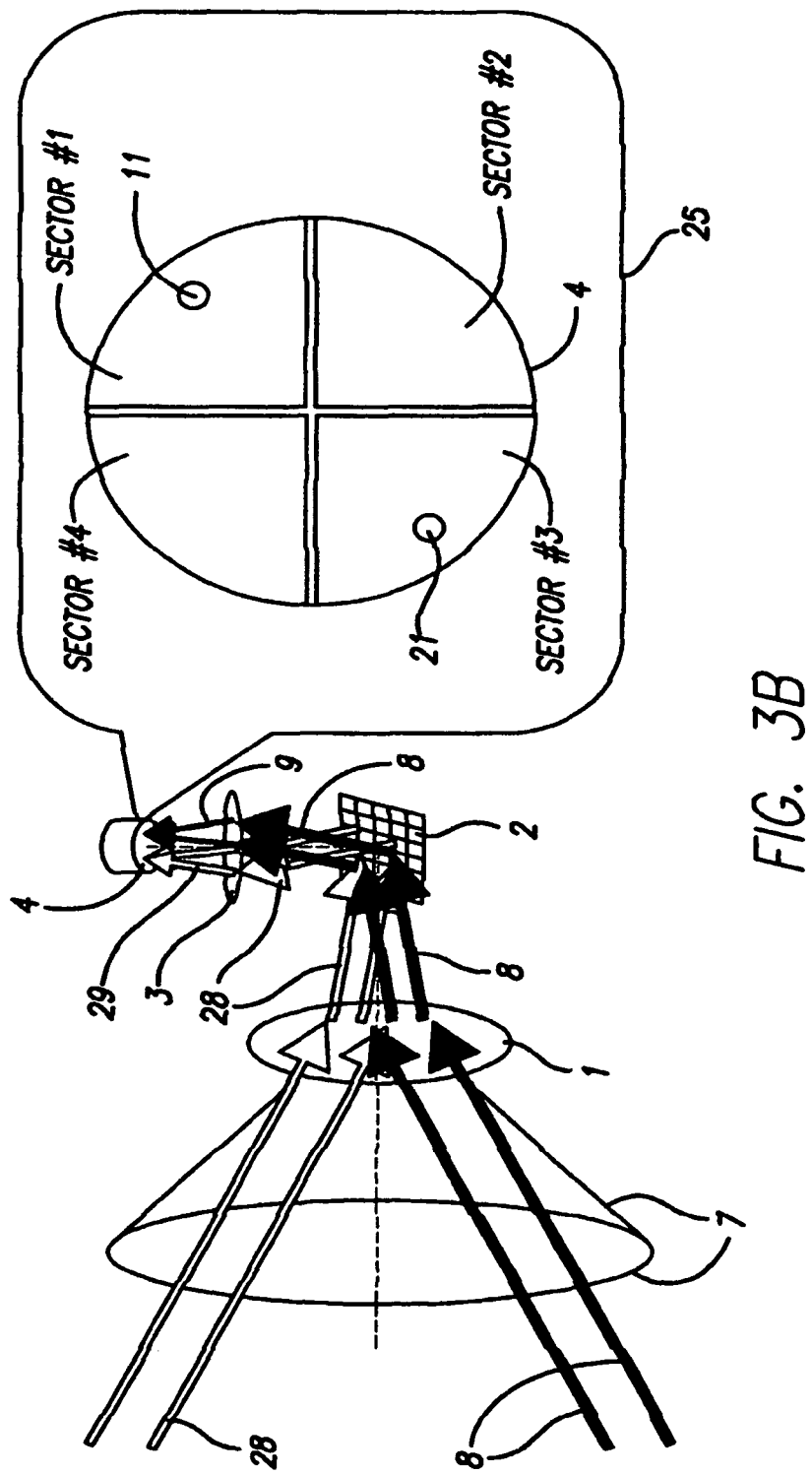
FIG. 3B is a like diagram illustrating the problem of detecting and locating more than one incident beam.

A significant benefit of the AMBS multisector-cell sensor is its ability to detect and address multiple engagements 25 (FIG. 3B) or in other words multiple incident light beams. As with a single engagement, the individual sharply focused spots 11, 21 impinge upon the multisector cell—which initially, in most cases, is in staring mode.

If the arrivals of the two beams 8, 28 are sufficiently separated in time, particularly by an interval greater than the duration of the capture sequence, then discrimination of the two sources (and their respective focused spots 11, 21) is greatly simplified. In that case, with respect to the first beam 8 the system can already be in a distinctly different mode of operation (the lock mode) when the second beam 28 (FIG. 3B) is focused 29 onto the multisector-cell sensor 4 and thereby detected.

Programming is very easily made sophisticated enough to memorize the location of the first spot 11 while performing a second capture sequence for the second spot 21. Since operating the mirrors to move the second spot 21 also moves everything else in the field of view, the first spot 11 is shifted away from the central intersection during the second capture sequence. One of the many logical-processing options includes then reverting to a check of the first spot position, which may have changed during analysis of the second spot.

If the detector is made to see a small field of view (e.g. with a zoom focusing lens 3) and if it is desirable to minimize confusion of the detection system by the first spot during scanning for other light sources, then a lock on the first spot 11 can be maintained with some of the mirrors in the MMS array while diverting the remaining mirrors to the second capture sequence for the second spot 21. (This option is available only for arrays having more than one mirror.) Additional beams arriving later can likewise be captured and locked.

Discrimination between the identities and effects of the different beams can be enhanced in various ways. For example in some special situations the system can impose small positional modulations on the different beams, but at different frequencies—and can apply synchronous detection to keep track of them independently.

Whether or not the beams arrive simultaneously, in the case of adequate incoming LOS angle between the beams the focus falls onto different sectors (e.g. quadrants). Logic in the system distinguishes this condition, for initially only one quadrant would be illuminated for a single incident beam.

In response to substantially simultaneous plural arrivals, a capture sequence similar to that described above is invoked. The laser beam focused into a particular arbitrarily chosen sector (e.g., quadrant #1) is driven to the central intersection first, and then the second beam is likewise driven to that intersection later.

Generally speaking, the number of different logical situations and logical-processing strategies in use of our invention can become rather high and quite complicated, depending on many factors. Such factors include the angles between beams, which portions of the multisector-sensor cell intercept the various beams respectively, the kinds and purposes of the beams, the kinds and motions of platforms, the political and other practical relationships between the different beamsource platforms, and whether the host platform of our invention is staffed or only automatic equipment.

This list is not complete; indeed yet many other considerations can come into play. Therefore it is not possible to definitively state what the best logical-processing sequences are likely to be. Given the information in this document, however, people of ordinary skill in this field and especially programmers can develop logical processing appropriate to the applicable particular combinations of all the known considerations.

As noted above the detector is not necessarily a quad cell but may instead have "N" sectors, where "N" is a number other than four. In such a case the multisector cell may be very loosely denominated an "Ndrant".

The probability of plural spots 11, 21 falling fortunately into different sectors is enhanced by building the sensor with more than four sectors. Increasing the number of sectors thus facilitates collecting additional information to support the detection and LOS measurement of simultaneous plural incident beams 8, 28. Operation with an Ndrant sensor is detailed later in this document.

Table 1 provides a predicted AMBS-quad-sensor performance summary of minimum irradiance-detection capability and associated angular-measurement uncertainty, for the incoming laser-beam. Given the information in this present document, extension to the multisector-cell case is straightforward for any particular number "N" of sectors; indeed, in Table 1 only the right-hand column is variable with number of sectors.

The data of Table 1 analyze silicon and mercury-cadmium-telluride detectors at 30° and 120° FOV for wavelengths of 0.4 µm, 1 µm and 5 µm. A broadband 0.5 to 5 µm operating range is realistic.

The MEMS array is already broadband, with a gold or silver coating. A dichroic beam splitter separating the bands spectrally allows a single system to feed both a visible-region silicon detector and an infrared mercury-cadmium-telluride detector.

TABLE 1

AMBS-quad-sensor performance

| | sensor configuration (all angles are FOV at 1 kHz) | wavelength $\lambda$ (µm) | minimum irradiance (W/cm$^2$) | LOS angular uncertainty (mrad) |
|---|---|---|---|---|
| 1 | Si detector, 30° | 0.4 | $2 \cdot 10^{-13}$ | 0.5 |
| 2 | Si detector, 120° | 0.4 | $2 \cdot 10^{-13}$ | 2 |
| 3 | Si detector, 30° | 1 | $8 \cdot 10^{-14}$ | 1 |
| 4 | Si detector, 120° | 1 | $1 \cdot 10^{-12}$ | 4 |
| 5 | MCT detector, 30° | 1 | $9 \cdot 10^{-11}$ | 1 |
| 6 | MCT detector, 120° | 1 | $1 \cdot 10^{-9}$ | 6 |
| 7 | MCT detector, 30° | 5 | $3 \cdot 10^{-11}$ | 6 |
| 8 | MCT detector, 120° | 5 | $5 \cdot 10^{-10}$ | 30 |

Preliminary performance requirements for an operational visible silicon-based AMBS quad sensor, or multisector cell, appear as Table 2.

TABLE 2

AMBS-sensor top-level performance requirements

| | Parameter | Operational System |
|---|---|---|
| 1 | field of view | 120° circular |
| 2 | detection wavelength | $\lambda = 0.5$ µm 1 µm |
| 3 | minimum detectable irradiance level (NDIL), S/N = 1 | $1 \times 10^{-13}$ W/cm$^2$ (at $\lambda = 1$ µm and 1000 Hz bandwidth) |
| 4 | angular uncertainty at MDIL | <1 mrad (1σ at 1 µm) |
| 5 | MEMS closed-loop step response, <4% | <100 µs |

The AMBS-multisector-cell-sensor system of this invention has five major functional elements, introduced above. Table 5 outlines relevant system parameters for those elements. Some details of these elements follow.

Figure 4:
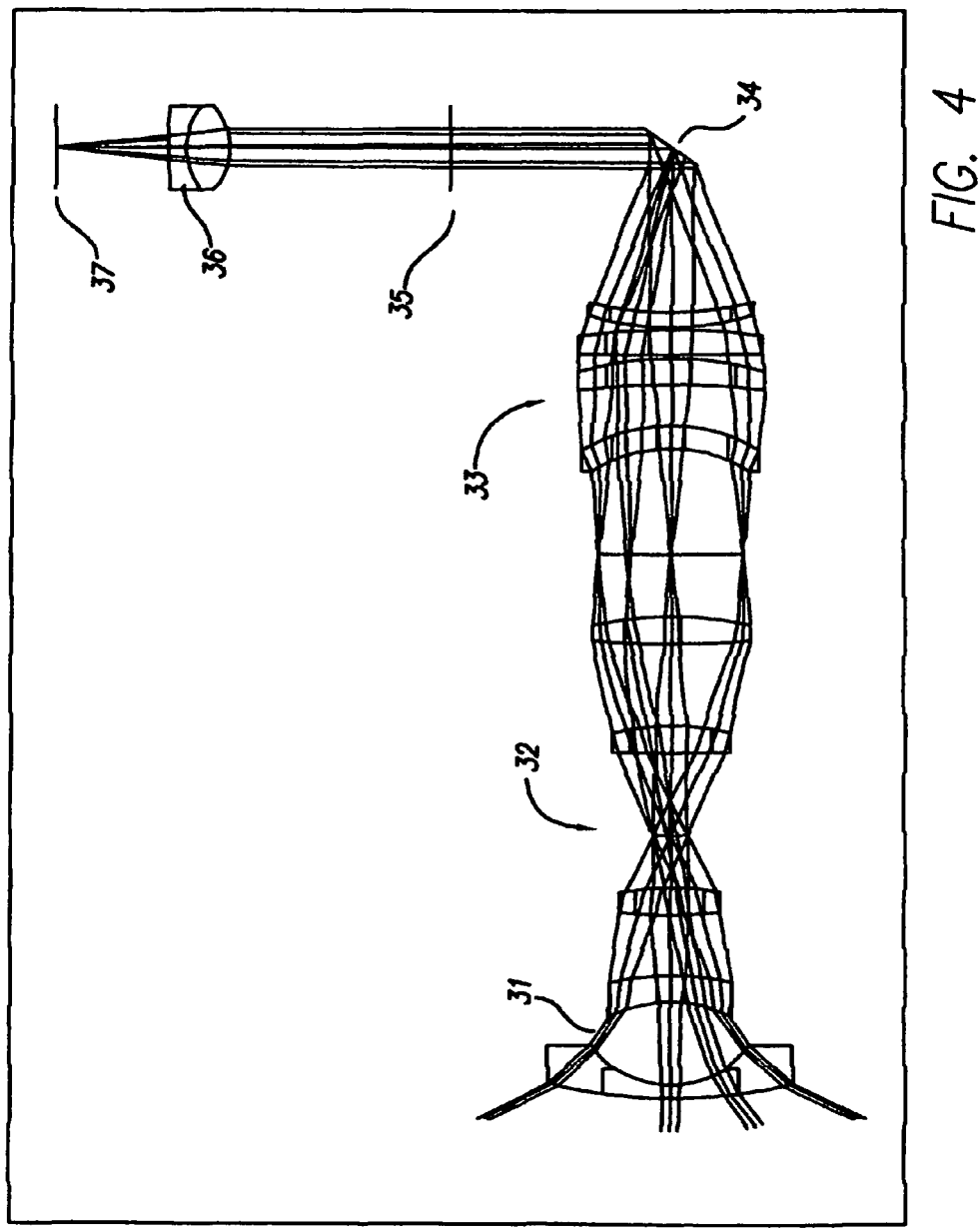
FIG. 4 is a design drawing for a 120° afocal lens, suitable for the system of either one of FIGS. 3A and 3B.

The afocal lens 1 (FIG. 2) is similar to other AMBS lenses discussed in the earlier patent documents mentioned in the "BACKGROUND" section. It can take the form of a 120° FOV afocal lens design with entrance pupil 31 (FIG. 4) of diameter 3.333 nm n, first stage 32 of focal length f=20 mm, and second stage 33 of focal length 3f. This design is intended for coupling to a two-axis MEMS array 34 having a mechanical scan angle of ±10° and ϕ=14 mm, a beam splitter 35 disposed along a substantially collimated segment of the optical path, a detector reimaging lens 36 of focal length $f_D$=35 mm, and a multisector-cell detector 37.

Afocal lens and beam-splitter assemblies have been demonstrated and in some cases are commercial, off-the-shelf ("COTS") modules. We have not yet performed custom development of a front-end design for a final operational embodiment of our invention, but believe that such development is wholly straightforward.

TABLE 3

Operational HEMS scan-mirror array design summary

| | Parameter | Requirement |
|---|---|---|
| 1 | individual scan-mirror clear aperture | 1 mm × 1 mm |
| 2 | total mirrors in array, distributed along X-Y axis with all scan axes parallel | X-Y array of 36 × 50 |
| 3 | mechanical scan angle about $\theta_X$, $\theta_Y$ | ±8° |
| 4 | minimum first mode frequency about $\theta_X$, $\theta_Y$ and Z | >1000 Hz |
| 5 | minimum mirror radius about either X or Y axis | >5 m |
| 6 | mirror reflectivity, $\lambda = 0.5$ µm to 5 µm | >95% |
| 7 | mirror to substrate areal density | >95% |
| 8 | embedded rotational sensor requirements | |
| 8.1 | angular range about $\theta_X$, and $\theta_Y$, | ±8° |
| 8.2 | angular resolution about $\theta_X$, and $\theta_Y$, | 150 µrad |
| 8.3 | angular measurement error about $\theta_X$, and $\theta_Y$, 1σ | 150 µrad |
| 8.4 | measurement bandwidth | 100 kHz |
| 9 | scan-mirror control | |
| 9.1 | step overshoot after settling time | <4% of step size |
| 9.2 | time to settle within allowable error | <100 µs |
| 9.3 | MEMS voltage driver | CMOS on-chip or equivalent |
| 9.4 | MEMS local-loop control | 10 kHz closed-loop control |
| 9.5 | electrical command interface | digital serial |
| 10 | environment | |
| 10.1 | operational temperature | −30 to 80° C. |
| 10.2 | shock loading | TBD |

As already noted the MEMS scan-mirror array 2 is a two-axis array. For prototype work—i.e. during ongoing development—such an array advantageously has all electronics, other than the embedded capacitive rotation sensors, off-chip.

In a final operational system, however, all drive electronics, high-voltage amplifiers and inner-loop PID controllers for each mirror in the array are very advantageously on-chip (as opposed to separate boxes of electronics off-chip). Ideally each mirror in the array is independently addressable through a serial interface.

Figure 5:
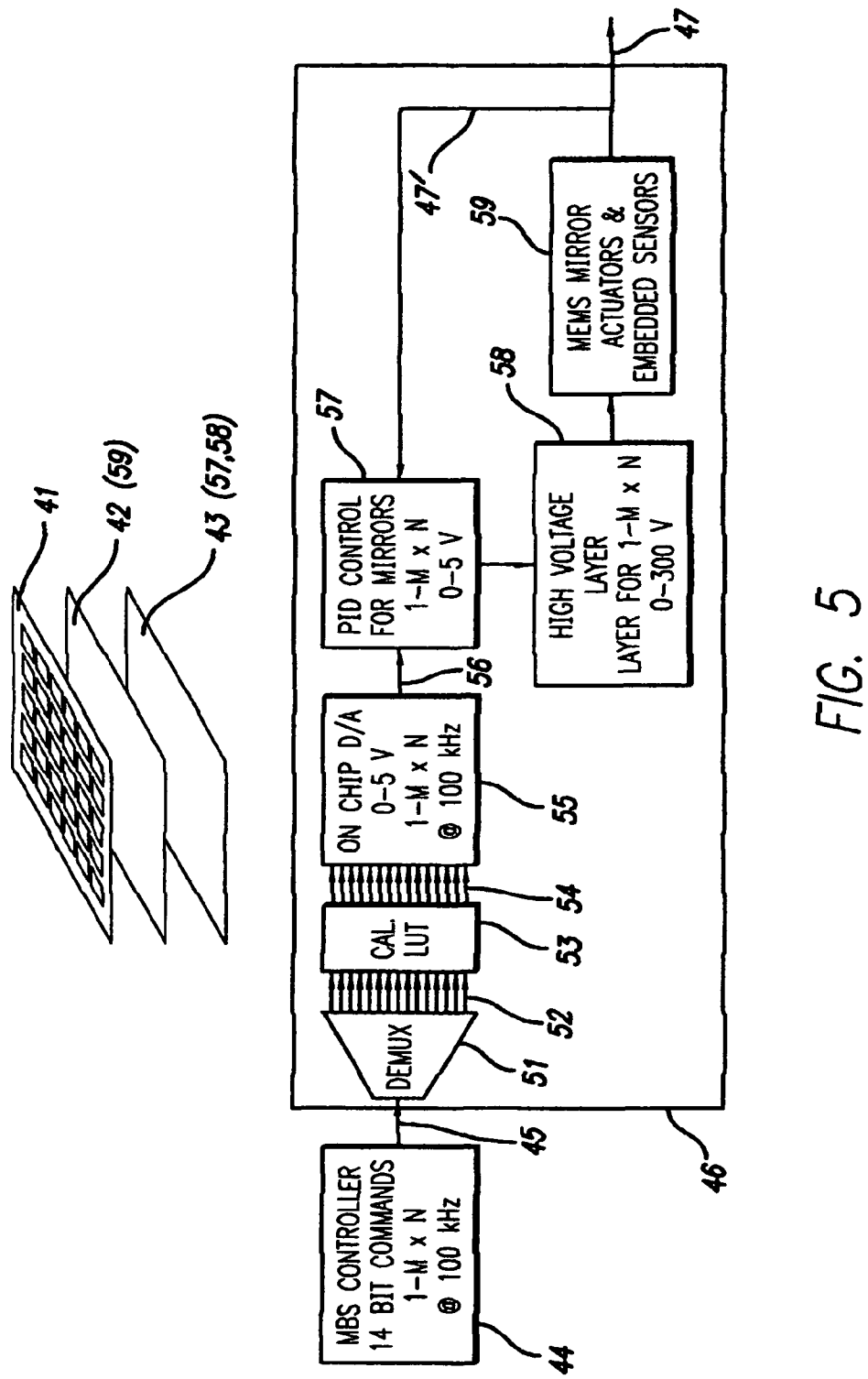
FIG. 5 is a compound illustration including, in the upper view, a diagram, highly conceptual, of three-layer MEMS mirror array architecture; and in the lower view a block diagram of functions performed by the array (numerical values in the blocks being merely illustrative)

Table 3 outlines requirements and goals for the MEMS scan-mirror array. Commands to the array are ideally applied through a digital serial interface 46 (FIG. 5), with its elements 51-59—resulting in output mirror motion 47. A final operational array should have the following on-chip functions:

a multiplexing (within the MEMS beam-steering controller 44, FIG. 5 lower view)
demultiplexing 51
calibration look-up table 53
D/A converter 55
proportional, integral, derivative (PID) controller 57 for each mirror
a high-voltage MEMS actuator driver 58
embedded rotation sensors 59.

Immediately below the array of mirror pads 41 is a physical layer 42, which may be called the "MEMS actuators and embedded rotation sensors" layer. This layer 42 includes the actuators-and-sensors block 59.

Within the interface 46, mirror motion is also fed back 47' to the PID controllers. This return serves particularly to implement the integral and differential aspects of the control—as is generally understood in the related field of electronic control systems, and accordingly is not further detailed here.

Below the actuator/sensor layer 42 is another physical layer 43, which includes in particular a CMOS mixed-signal PID controller 57 and high-voltage circuits 58. Remaining circuit blocks 44, 51-56 may be distributed as between the lower two physical layers 42, 43, or the main-logic controller 44 may be elsewhere in the chip.

The controller 44 sends multiplexed commands, for all the mirrors, to the submirror layers 42, 43. After demultiplexing 51, the system carries control data 52 for each mirror independently.

Each mirror, furthermore, has been calibrated independently. The calibration, stored in and applied from a lookup table ("LUT") 53, considers not only mechanical variations within the mirror actuators and sensors 59, but also optical nonlinearities and variations elsewhere in the system, particularly in the afocal lens 1. The many individual mirror-control signals from the LUT 53 accordingly are corrected for all known perturbations from ideal operation.

The remainder of the system 54-59, 47, 47' too—although illustrated as unitary—is multiple, i.e. provides a separate, independent control-signal channel for each mirror. Following the digital-to-analog converter block 55, analog mirror-control signals 56 flow to the individual PID control blocks 57.

These analog signals 56 control electrical signals from the earlier-mentioned high-voltage block 58, which in turn produce mechanical signals from the previously mentioned actuators-and-sensors block 59. These mechanical signals physically move 47 the mirrors.

Figure 6:
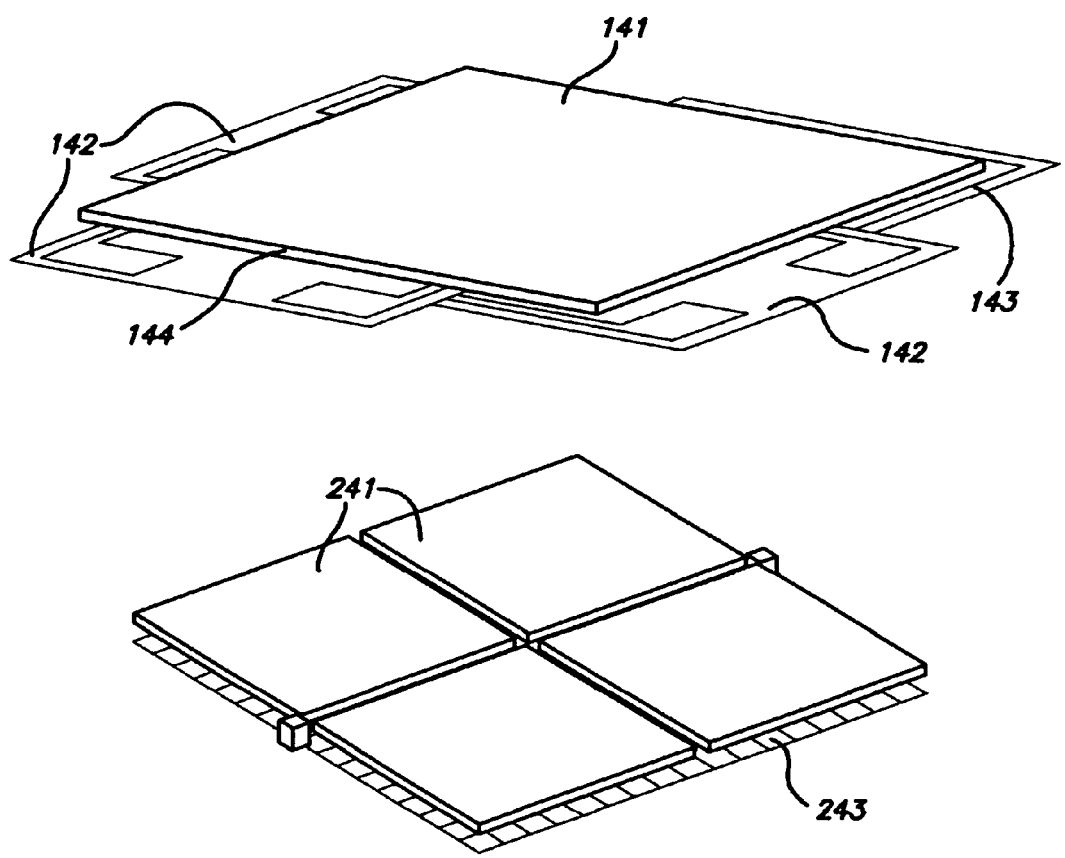
FIG. 6 is a set of two perspective or isometric views of prototype MEMS mirrors, capable of independently controllable motion in the tip, tilt, and piston directions—the upper view being a single mirror 800 µm square with control elements below, and the lower view a two-by-two array of mirrors each 400 µm square.

We have developed prototype MEMS scan-mirror units (FIG. 6) with tip, tilt and piston capability—fabricated for us by a vendor. They have very high fill-factors.

One such mirror unit (upper view) has extended pads 142 for electrical characterization in the prototype phase, fully covered with a low-inertia micromirror 141, 800 µm (0.8 mm) square. While the entire mirror is plainly very thin for minimum inertia, a particularly remarkable feature of the design is that each of the visible side faces 144 is actually a thicker, stiffening truss, 15 µm tall. Another completed prototype is a two-by-two array of actuators 243 (lower view), 0.4 µm on a side, with a two-by-two array of micromirrors 241 batch transferred.

This implementation of the actuators is based on preengaged vertical comb drives in silicon-on-insulator ("SOI") format, and a gimballess design demonstrated previously in large tip-tilt devices. (This design actually does have gimbals of a sort, but not macroscopic ones; they are truly microgimbals, each supporting just one of the micromirrors in the array.)

The fabrication process is derived from the multilevel-beam SOI-MEMS process. For small array elements, backside etching can be eliminated.

Three masks are used for deep-reactive-ion etching ("DRIE") into the device layer of an SOI wafer, to achieve isolated sets of vertical comb drives with "up" or "down" actuation. Low-inertia micromirrors are fabricated in a separate SOI wafer in a three-level selective DRIB process.

Individual thinned micromirror plates, stiffened by a backbone of thicker trusses (including the side walls as mentioned above), were transferred and bonded onto the actuators using custom-fabricated microtweezers. Batch bonding and alignment of multiple mirrors for large-scale, high-fill-factor arrays is a preferred technique for fabricating our invention.

Adequate illuminance sensitivity for meaningful deployment of our invention requires transferring sufficient optical input power from the afocal lens to the multisector-cell detector. Our quantitative analyses of this system translate this requirement into a specification for MEMS array size of roughly 36×50 mm, assuming a favorable fill factor that is well over 95%.

As indicated above, prototype small elements (one unit mirror, and a two-by-two prototype subarray) of a MEMS array have been demonstrated, but a full-size array (e.g. 36×50 mm as just noted) remains to be developed. We estimate the cost of such an effort—for an array with all electronics on-chip—at roughly $2 million to $4 million.

As to the reimaging lens at the multisector cell, tradeoffs are advisable regarding f/number and minimum detectable irradiance level (MDIL). Given that MDIL is a driving requirement for best overall performance, the smallest possible f/number design should be developed to minimize the required quadrant-detector size.

Noise-equivalent power ("NEP") is driven by detector size, due to the resulting resistance and capacitance. We consider a custom reimaging lens to be most highly preferred, although commercial alternatives bear investigation.

Coming to the multisector cell detector itself, one preferred embodiment of the invention uses a commercially available silicon quadrant detector (quad cell)—particularly as this configuration can be fabricated most promptly and, probably, at lowest cost. Currently, the largest commercial detector that has been found with the required low-noise characteristics is the 7 mm×7 mm Photonic Detectors Inc. model PDB-C206.

In the longer term, and with particular emphasis on ability to sense and locate plural (even multiple) incident light beams, the "Ndrant" (i.e., higher-order multisector) forms of the sensor cell are more highly preferred. Although a quad cell, and even a lower-order (i.e. tri-sector) cell, can deal with plural beams, an Ndrant of six, eight or more sectors offers greater speed, stability and pointing accuracy.

Figure 7:
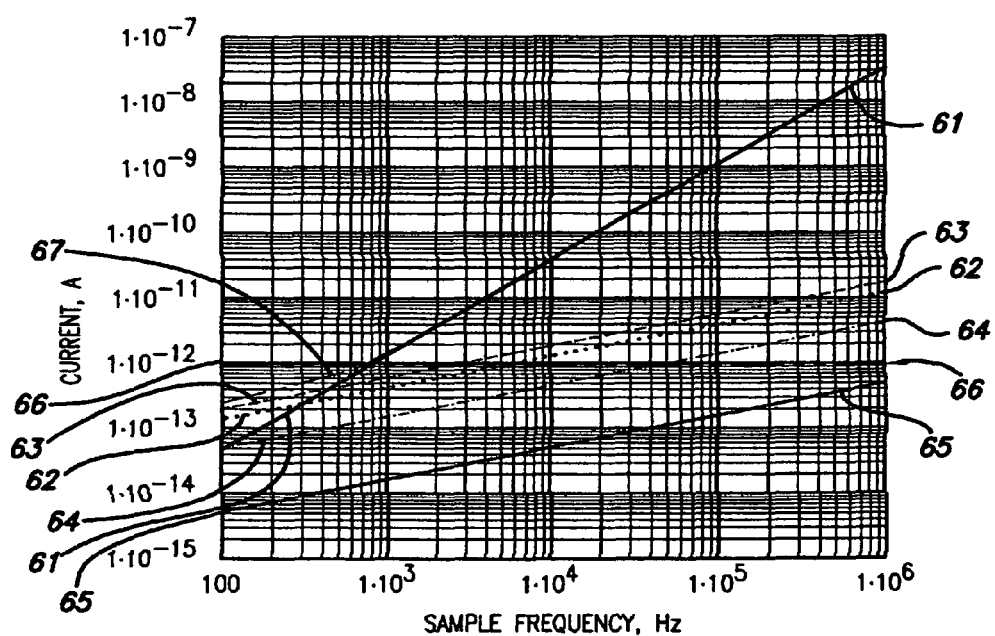
FIG. 7 is a graph of AMBS noise sources, expressed in terms of electrical current (A) as a function of sample frequency (Hz)

A key parameter in usefulness of a laser-alert system is minimum detectable irradiance level ("MDIL"), and this in turn depends strongly on signal-to-noise ratio ("S/N" or "SNR"). We have prepared a MathCad model of SNR in our sensor system, with these five noise contributors:

1. feedback-resistor noise $I_{rf\_OpAmp}$ 64 (FIG. 7);
2. interelectrode resistor noise $I_{R\_Det}$ 63;
3. dark-current noise $I_{dark\_Current}$ 62;
4. voltage amplifier noise current $I_{voltage\_Amp}$ 61; and
5. shot-noise current $I_{shot}$ 65.

It is essential to consider the currents associated with each of these noise terms as a function of sample frequency, the total root-sum-square ("RSS") noise current, $I_{Tot}$ 67 and particularly in comparison with the signal current $I_{Laser}$ 66 (a constant current level in FIG. 7) from an average laser irradiance of, typically $10^{-13}$ W/cm² at $\lambda_m=0.4$ µm (Table 4). Thus as shown the signal 66 when compared with the total noise 67 yields, for this case, SNR exceeding unity at sample frequencies under 700 Hz.

The detector-amplifier voltage noise 61 is a function of sample frequency, FOV, MEMS mirror angle, the op-amp voltage and feedback resistance, entrance-pupil aperture and f/number. The dark-current noise 62 is a function only of sample frequency and, of course, dark current.

The interelectrode resistor noise 63 is a function of the frequency, temperature, FOV, MEMS angle, and again the aperture and f/number. Feedback-resistor noise 64 is a function of frequency, temperature, and the op-amp feedback resistance.

The signal 66 is a function of the laser irradiance and wavelength, FOV, mirror angle, and the aperture. The shot-noise current 65 depends upon those same parameters and the sample frequency.

In all configurations, the detector-amplifier voltage noise 61 ultimately dominates the noise terms at higher frequency, driven by the detector capacitance and resistance. This in turn drives the design to minimize the resulting detector size, for it determines the performance limit.

TABLE 4

SNR-model example sensor configuration

| Parameter | Value |
|---|---|
| pupil diameter | 40 mm |
| wavelength | 0.4 µm |
| FOV | 30° |
| MEMS mechanical scan angle | ±10° |
| temperature | 77° K. |
| afocal magnification | 0.75 |
| reimaging-lens f# | 0.25 |
| reimaging-lens focal length | 24 mm |
| quad-cell diameter | 18 mm |
| quad-cell capacitance | $3 \times 10^{-10}$ Farad |
| quad-cell resistance | $1.3 \times 10^{7}$ Ω |
| quad-cell parallel resistance with amplifier | $1.2 \times 10^{7}$ Ω |
| MEMS array size | 71 mm x 100 mm |

We have analyzed MDIL performance for the AMBS-multisector-cell-sensor system, for 30° and 120° FOV systems respectively, for λ=0.4 µm and 1 µm assuming silicon detectors, and λ=1 µm and 5 µm assuming mercury-cadmium-telluride detectors. Performance for the silicon detector at λ=1 µm (FIG. 8) is noteworthy.

Plotted against laser irradiance on a log-log scale, angular measurement uncertainty 71 in the incoming LOS, for f/0.25, appears as descending straight lines at about 45° (with corresponding SNR 72 at about the same slope but ascending). These modeling results were obtained for measurement bandwidth of 1 kHz.

Figure 8:
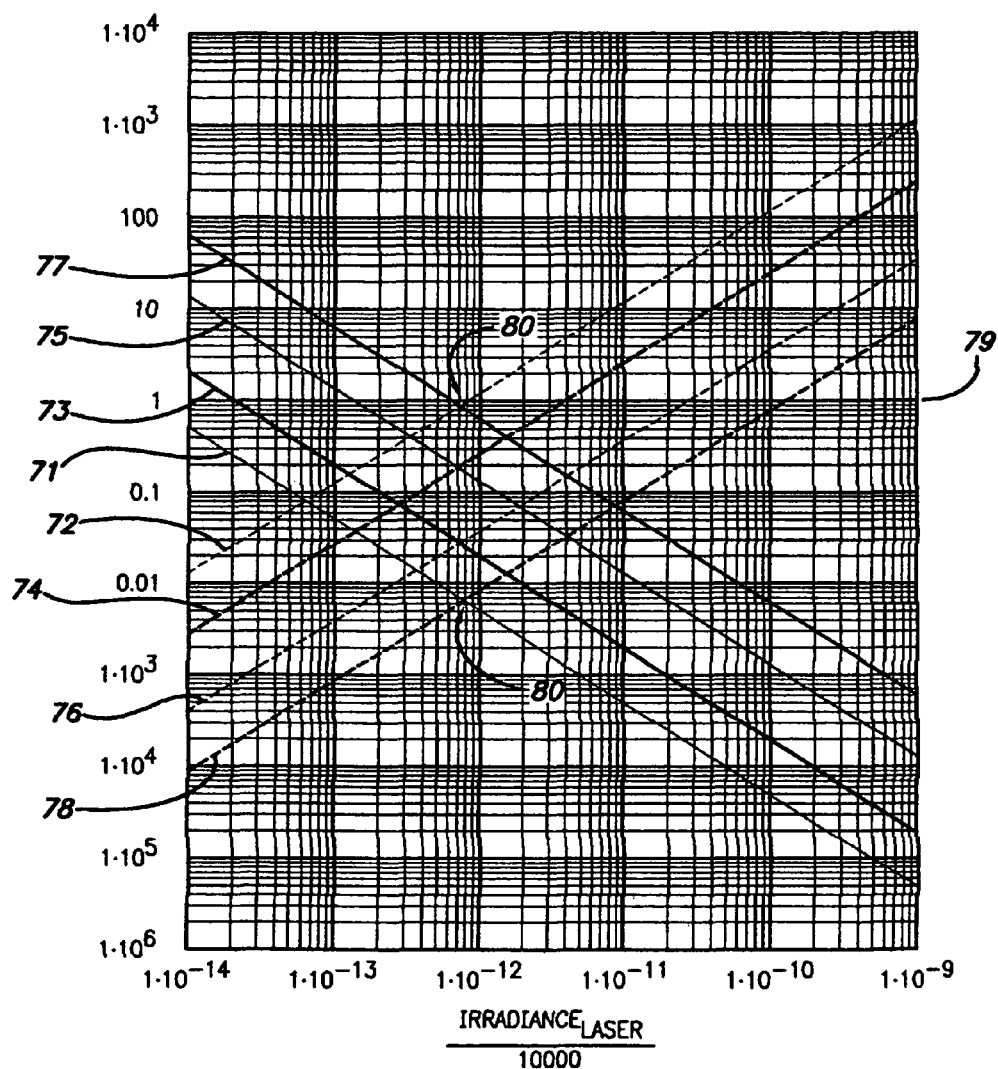
FIG. 8 is a graph of performance of an afocal MEMS beam-steering system, in terms of (1) signal-to-noise ratio S/N and (2) angular measurement uncertainty $\Delta\alpha$ in line-of-sight ("LOS") location of the incoming beam, both as a function of irradiance—for 30° field of view, wavelength of 1 µm, and a silicon detector (120° and higher FOVs are discussed elsewhere in this document)

Minimum detectable irradiance level occurs for SNR>1, or in other words at SNR greater than the unity level 79. The ordinate scale in FIG. 8 is the SNR only; in other words, LOS uncertainty is not marked on the graph—but at top that uncertainty is very high, $1.117 \cdot 10^{3}$; and at bottom, $4.367 \cdot 10^{-6}$.

Similarly LOS uncertainty 73 for f/0.5 is roughly one-half order lower, with corresponding SNR 74 one-half order higher. Yielding like results but with still-higher LOS uncertainty and lower SNR are the same four data sets 75, 76 and 77, 78 respectively, but assuming measurement bandwidth of 10 kHz.

Thus four configurations were modeled: f/numbers of 0.25 and 0.5, with measurement bandwidths of 1 kHz and 10 kHz—and with entrance-pupil diameters of 2.5, 20 and 40 mm. For 2.5 mm diameter, the entrance pupil 80 corresponds to the crossover points between the SNR and corresponding LOS-uncertainty curves, at laser irradiance of roughly $6 \cdot 10^{-7}$.

While most of our analyses discussed in this document draw attention to theoretical sensitivity, another very important set of criteria relates to ability of the invention to discriminate between artificial light-beam sources and natural sources—especially important when the latter are equal or greater in brightness or irradiance, or both. Thus natural sources pose a potential for false alarms, as well as for blocking our invention from generating its full expected response to incident laser beams and the like.

Some operational environments for our invention are relatively remote from the earth—for example, in high orbits suited to space-station operations and even interplanetary platforms. Other environments encompass near-earth aircraft operation and even earth-based stationary facilities.

Each of these operating environments is susceptible to its own respective interferants. Thus for instance deployment of our invention in combat aircraft may be more vulnerable to sunlight reflection from the ground or from water, and other kinds of deployment may be more readily disrupted by sunlight received directly.

Figure 9:
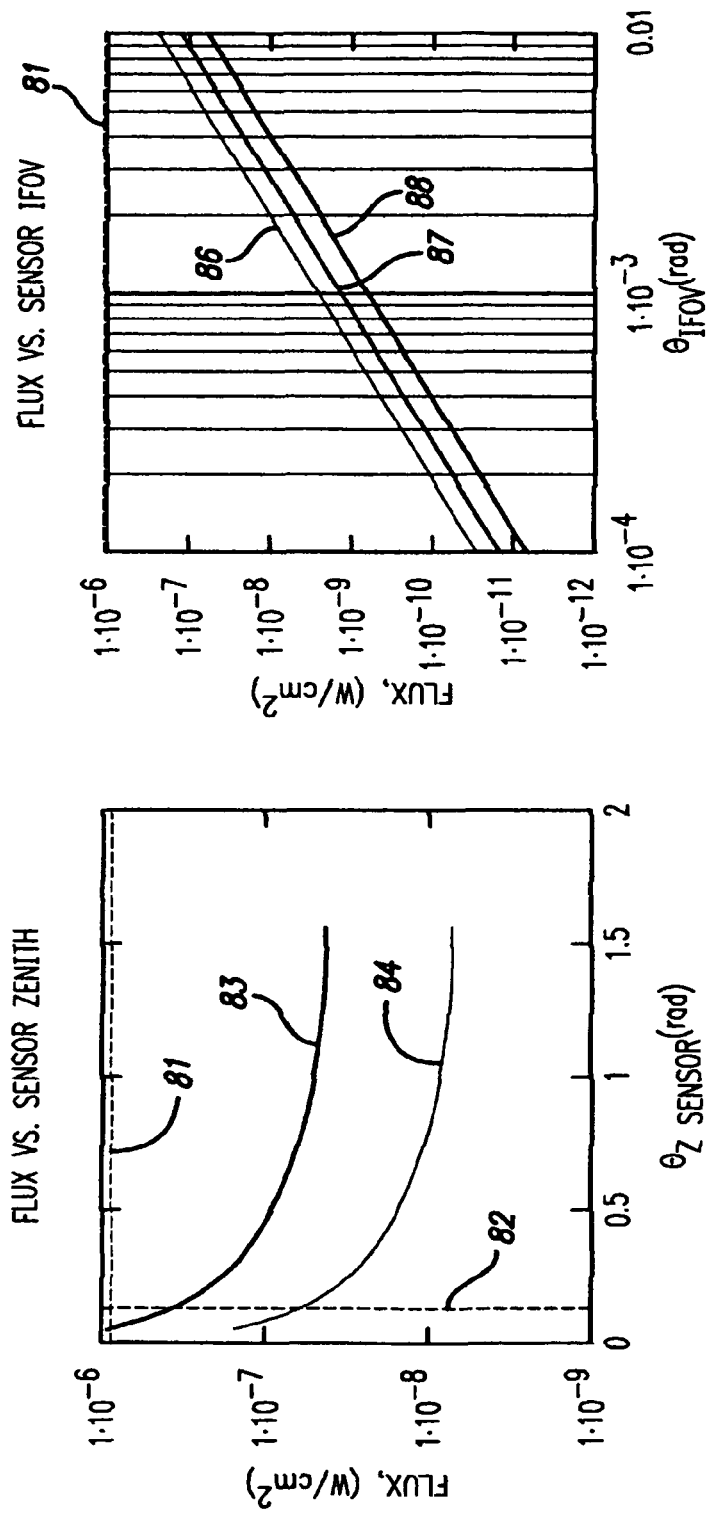
FIG. 9 is a pair of graphs showing solar-background irradiance ($W/cm^2$) vs. sensor zenith angle (radians, left-hand view) and instantaneous field of view (IFOV in radians, right-hand view)

Particularly illustrative of system discrimination capability is the d. c. irradiance at the sensor entrance pupil due to solar energy reflected from the ground, in the wavelength range 850 to 905 nm (our "Laser BeamRider" regime). Naturally this distracting source is progressively less significant as the sensor is pointed higher, accounting for the downward slopes of the curves 83, 84 (FIG. 9) for 10 and 4 mrad respectively.

Both curves are impressive, showing system-response numbers lower than the laser irradiance limit 81 by an order of magnitude and more—for sensor zenith angle only one to three times the minimum zenith angle 82 for the sun itself. (As the IFOV or zenith angle increases, the area imaged by the sensor increases, and resulting solar background irradiance also increases.)

Also promising are the solar background irradiances 88, 87, 86 as a function of sensor IFOV for earth reflectivities of 10%, 20% and 40% respectively—at a sensor zenith angle of 10°. These values too are substantially below the laser irradiance 81. Since we want to detect irradiance on the order of $1 \times 10^{-13}$ W/cm$^2$ with a field-of-view of 120°, temporal filtering is required.

Figure 10:
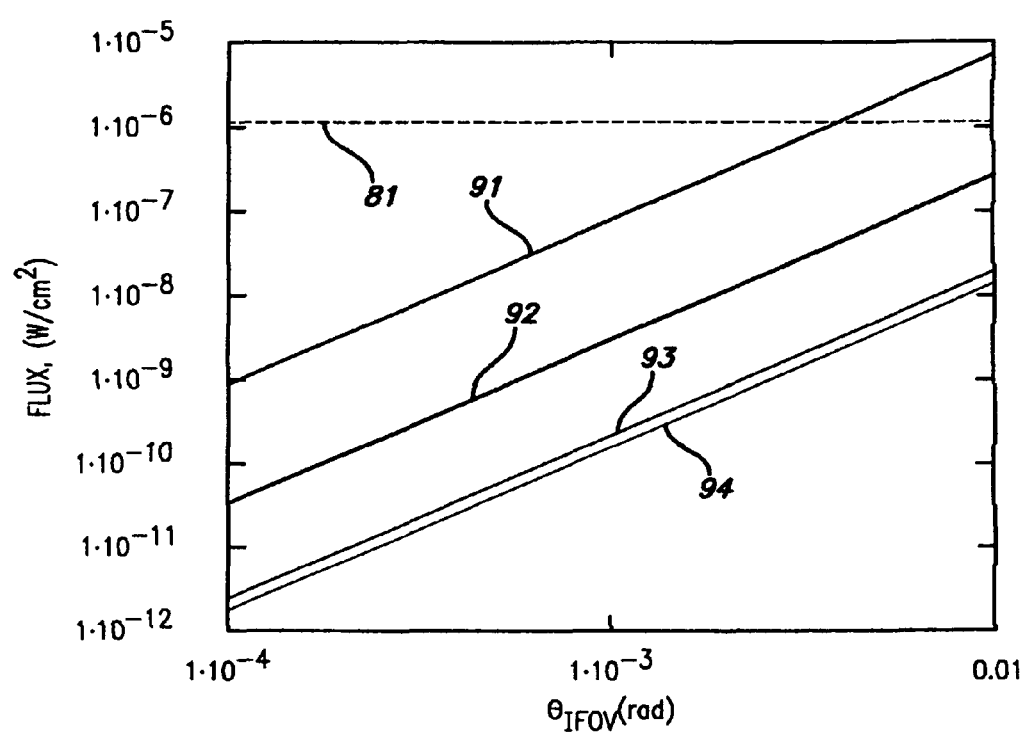
FIG. 10 is a graph of solar-glint irradiance ($W/cm^2$) vs. IFOV (radians)

An analogous mode of interference is solar glint from water, which also potentially generates system false alarms. Glint is a function (FIG. 10) of sensor field-of-view and solar zenith angle. Given that the sun is an extended source of 10 mrad, it can be discounted as a false alarm. Low-pass temporal filtering will eliminate glint as a noise source.

Our invention relies upon a programmed AMBS control unit, customized to include closed-loop input from the multisector-cell detector and laser-capture logic. In prototype work the control unit typically includes a PC operator interface, a high-speed digital FPGA command to the MEMS array, and a D/A interface to an analog PID controller and MEMS voltage driver. For production of an operational system, in the interest of enhanced compactness, reliability and speed these elements are ideally incorporated into an ASIC with custom operator interface.

Suitable quad-cell detectors for final, operational practice of our invention are available on a COTS basis. Nevertheless this component of the invention has two characteristics that we have not fully resolved:

First is the problem of detecting low-level laser signals against large background noise sources. A full evaluation of this problem remains

TABLE 5

AMBS-quad-sensor operational approach

| | AMBS-quad sensor element and parameter | Value |
|---|---|---|
| 1 | afocal lens | |
| 1.1 | field of view | 120° |
| 1.2 | pupil diameter | 6 mm |
| 1.4 | magnification | 6:1 |
| 2 | MEMS scan-mirror array | |
| 2.1 | MEMS scan-mirror array size | 36 mm x 50 mm |
| 2.2 | MEMS mirror size | 1 mm x 1 mm |
| 2.3 | HEMS scan angle, mechanical | 2-axis, ±5° |
| 3 | reimaging lens | |
| 3.1 | f# | 0.5 |
| 3.2 | focal length | 18 mm |
| 4 | quadrant detector, silicon | PDI, PDB-C206 |

TABLE 5-continued

AMBS-quad-sensor operational approach

| | AMBS-quad sensor element and parameter | Value |
|---|---|---|
| 4.1 | detector size | 7 mm × 7 mm (16° FOV) |
| 4.2 | detector performance, NEP @ 1000 Hz | ≈$10^{-12}$ W |
| 5 | AMBS control unit | |
| 5.1 | user input and control | digital controller |
| 5.2 | closed-loop control | PID control | to be performed. We strongly believe that such an evaluation should begin with noise-sensitivity analyses, and demonstration of system operation with a variety of background noise sources.

Second, we have not yet elaborated the Ndrant (lower- and higher-order multisector cell detector) aspects of the invention to the same extent as the quad cell. A basic analysis of such a detector and its capture-sequence details follows here:

In principle the number of sectors may be any number greater than two. Higher numbers of sectors, however, facilitate detecting and localizing greater numbers of incident light beams—concurrently or even simultaneously.

The ideal number depends upon the probable number of incident beams that may be encountered, and their probable angular separation. The principal limiting considerations are the cost of manufacture and the resulting complexity of the electronics and logic.

Very generally these adverse factors are minor in comparison with other costs and complications, particularly since the electronics are usually implemented in monolithic form—and particularly when balanced against potential loss or damage of equipment if an incident beam escapes detection. Hence a preferred number of sectors is typically in the range of ten to one hundred, inclusive.

Figure 11:
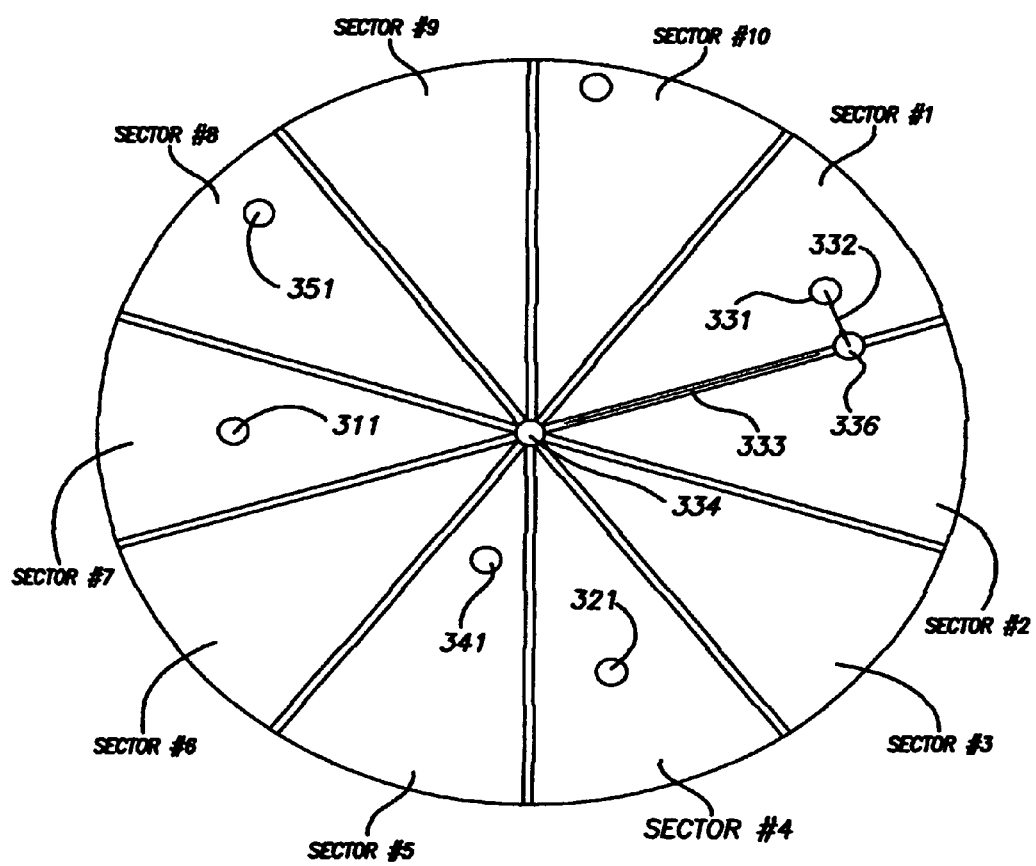
FIG. 11 is a diagram, like FIG. 3A, showing search and capture sequence for a multisector or "Ndrant" sensing cell (particularly shown is an exemplary ten-sector cell).

Accordingly, use of a multisector-sensor cell with ten sectors, #1 (FIG. 11) through #10, can greatly aid in timely detection and alert for incident-beam focused spots 311, 321, 331, 341, 351 etc. As in the simpler case of a quad cell (FIG. 3B), the beams one at a time—in turn—are detected, driven to null at the center intersection, their corresponding mirror angles read to memorize locations, and then released so that the apparatus is available for the succeeding beam or beams.

More specifically, after spots 311 and 321 have been processed the apparatus can turn its attention to spot 331. As before this spot is driven to a sector boundary, preferably but not necessarily the nearest one—i.e. the boundary between sectors #1 and #2.

Ordinarily but not necessarily the preferred path 332 to the boundary is normal to the boundary. From the intersection 336 of the path with the boundary, the spot 331 is next driven 333 to the center intersection 334.

Once the mirror readings have been stored for spot 331, the system can turn to another incident-beam focused spot 341. It then repeat substantially the same process but with respect to the sector boundary appropriate to that spot.

It will be understood that if all the beams appear at substantially the same time, the order of processing of the plural incident-beam spots is largely arbitrary. Otherwise the spots are best taken up in order of appearance.

Another preferred embodiment of our invention relates to so-called "active" sensing of potentially hostile platforms such as, for example, guided missiles. As mentioned earlier, this variant of the invention, rather than passively sensing incoming light beams, first emits an outgoing light flash and then monitors reflections of the flash.

Such a system is particularly effective in generating and detecting retroreflections from a remote optical system that is optically homing on our own host platform. Such a remote optical system necessarily includes a front-end optic pointed toward our host, and behind that optic a detector of some kind.

The detector is commonly based on silicon, or other materials such as mercury-cadmium-telluride—depending on wavelength—and typically mounted in or otherwise surrounded by a metallic matrix. Both the detector and matrix are ordinarily very reflective, and the front-end optic of the remote system essentially ensures effective optical coupling between the optical system of our invention and those highly reflective components.

Hence retroreflection is an efficient mode for locating hostile remote platforms. A drawback is the need to further reveal the exact location of our own platform by our pulse excitation which is retroflected; however, there are several known techniques for minimizing this problem, including release of chaff or decoys, as well as evasive action.

The retroreflection mode can be particularly useful in both ranging and velocity determination, for the remote system. Our several patents and other publications in the area of light detection and ranging ("LI-DAR") provide extensive details that are applicable in the exploitation of information obtained by these "active" forms of our present multisector-cell sensing invention.

It will be understood that the foregoing disclosure is intended to be merely exemplary, and not to limit the scope of the invention—which is to be determined by reference to the appended claims.

We claim:

1. A method for detecting, and determining the direction of, an incident beam of light; said method comprising the steps of:
   receiving the incident beam of light on a multiple-sector-cell detector;
   operating the multiple-sector-cell detector to determine that a first sector of the multiple sectors has received the incident beam of light;
   first deflecting the incident beam of light by a first measured amount, along the multiple-sector-cell detector, to reach a boundary between the first sector and another sector of the multiple sectors;
   wherein the first deflecting the incident beam of light is performed along a track that is generally normal to the boundary between the first sector and the another sector of the multiple sectors; and
   second deflecting the incident beam of light by a second measured amount, along the boundary, to reach a central position of the multiple-sector-cell detector.

2. The method of claim 1, further comprising the step of:
   interpreting the first and second measured amounts of deflection to determine a source direction of the incident beam of light.

3. The method of claim 2, further comprising the step of:
   reporting, to a human operator or to an automatic apparatus, the source direction of the incident beam of light.

4. The method of claim 2, wherein the incident beam of light is a first incident beam of light, the method further comprising the steps of:
   receiving a second incident beam of light on the multiple-sector-cell detector after receiving the first incident beam;
   wherein the operating step is a first operating step;
   second operating the detector to determine that a second sector of the multiple sectors has received the second incident beam of light; and deflecting the second incident beam of light by a third measured amount, along the multiple-sector-cell detector, to reach a second boundary between only two of the multiple sectors.

5. The method of claim 2, further comprising the step of:
projecting light illuminating an object and thereby generating the incident beam of light by reflection from the object.

6. The method of claim 5, further comprising the step of:
reporting, to a human operator or to an automatic apparatus, the source direction of the incident beam of light.

7. The method of claim 5, wherein the incident beam of light is a first incident beam of light, the method further comprising the steps of:
receiving a second incident beam of light on the multiple-sector-cell detector after receiving the first incident beam;
wherein the operating step is a first operating step;
second operating the detector to determine that a second sector of the multiple sectors has received the second incident beam of light; and
deflecting the second incident beam of light by a third measured amount, along the multiple-sector-cell detector, to reach a second boundary between only two of the multiple sectors.

8. The method of claim 1, further comprising the step of:
projecting light illuminating an object and thereby generating the incident beam of light by reflection from the object.

9. The method of claim 1, wherein the central position includes a boundary that is common to a majority of the multiple sectors.

10. The method of claim 4, wherein the second sector is different from the first sector.

11. The method of claim 4, further comprising the step of:
storing information about the source direction of the first incident beam of light before deflecting the second incident beam of light by the third measured amount.

12. The method of claim 11, wherein the step of deflecting the first incident beam of light is performed synchronously with the step of deflecting the second incident beam of light thereby producing positional modulations on the first incident beam at a first frequency and thereby producing positional modulations on the second incident beam of light at a second frequency, different from the first frequency.

13. The method of claim 4, wherein the deflecting is performed by an array of deflectors, the method further comprising the step of:
deflecting the first incident beam of light with a first portion of the array of deflectors; and
deflecting the second incident beam of light with a second portion of the array of deflectors, separate from the first portion of the array of deflectors.

14. The method of claim 13, wherein the deflecting the first incident beam of light step and the deflecting the second incident beam of light step are performed simultaneously.

15. The method of claim 7, wherein the second sector is different from the first sector.

16. The method of claim 7, further comprising the step of:
storing information about the source direction of the first incident beam of light before deflecting the second incident beam of light by the third measured amount.

17. The method of claim 16, wherein the step of deflecting the first incident beam of light is performed synchronously with the step of deflecting the second incident beam of light thereby producing positional modulations on the first incident beam at a first frequency and thereby producing positional modulations on the second incident beam of light at a second frequency, different from the first frequency.

18. The method of claim 7, wherein the deflecting is performed by an array of deflectors, the method further comprising the step of:
deflecting the first incident beam of light with a first portion of the array of deflectors; and
deflecting the second incident beam of light with a second portion of the array of deflectors, separate from the first portion of the array of deflectors.

19. The method of claim 18, wherein the deflecting the first incident beam of light step and the deflecting the second incident beam of light step are performed simultaneously.

* * * * *